July 31, 1934.    H. C. HARRISON    1,968,448
SOUND MEASURING SYSTEM
Filed Feb. 24, 1928
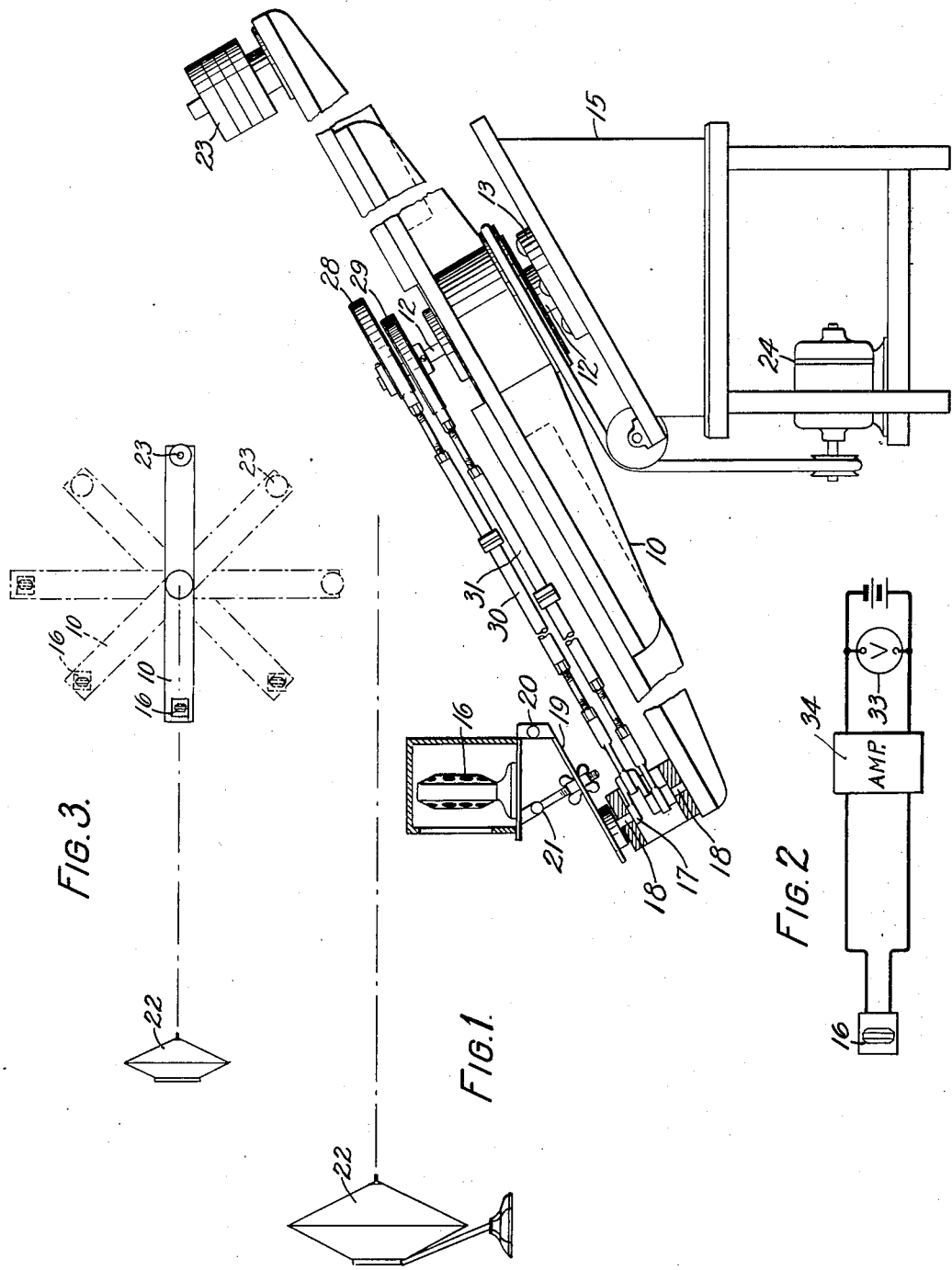
INVENTOR
HENRY C. HARRISON
BY H G Bandfield
ATTORNEY Patented July 31, 1934

UNITED STATES PATENT OFFICE 1,968,448

SOUND MEASURING SYSTEM

Henry C. Harrison, Port Washington, N. Y., assignor to Bell Telephone Laboratories, Incorporated, New York, N. Y., a corporation of New York Application February 24, 1928, Serial No. 256,794

16 Claims. (Cl. 181—0.5)

This invention relates to the measuring of sound intensity and more particularly to a device and method for measuring sound intensity in a confined space.

Heretofore in measuring the intensity of a sound emanating from a given source it has been found desirable to make the measurements in open air in order to avoid the standing wave pattern, which is present in a confined space, due to the sound waves being reflected from the walls of the enclosure.

In accordance with this invention a sound detector which is suitably connected by means of an electrical circuit to a calibrated measuring device such as a voltmeter or an ammeter, is continuously moved about an enclosure preferably in both a horizontal and vertical plane. As the device is moved about the enclosure it is continuously passing through areas of different sound intensities, caused by the sound waves being reflected from the walls of the enclosure. This difference in sound intensities causes corresponding variations in the output of the sound detector and a mean reading on the scale of the measuring device gives a measurement of the intensity of sound emanating from the given source. This measurement will be substantially free from distortion due to the sound waves being reflected from the walls of the room in which the measurements are made.

In a specific form of this invention, a sound detector is mounted on a rotatable arm in such a manner as to always face the source of sound. The device is then rotated about the enclosure at an angle of approximately 45° to the horizontal. The voltage generated in the detector, due to variation in the sound intensity is fed to an amplifier, the output of which is connected to a suitable measuring device, for example, a thermal-meter, a thermocouple in combination with a direct current meter or a vacuum tube rectifier and a suitable direct current meter.

Since the voltage generated is directly proportional to the variations in the sound density, the mean reading on the measuring instrument will accurately indicate the mean energy density around the path traversed by the sound detector, thereby overcoming any distortion that standing waves might have on the measurement of the sound density if only a single reading were taken.

This invention may be more clearly understood by reference to the accompanying drawing in which;

Fig. 1 is a side view of a sound measuring system showing the arrangement of parts; Fig. 2 is a diagrammatic view of the electrical circuit embodied in this invention and Fig. 3 is a schematic view showing the position which the sound detector assumes with respect to its rotating arm as it is rotated about a room.

Referring to Fig. 1 it is seen that shaft 12, to which is fixedly attached a rotatable arm 10, preferably made of soft wood, is journaled in bearing plate 13 attached to the top of table 15 and inclined at an angle of approximately 45° to the horizontal. A sound detector 16, preferably a condenser transmitter, is connected by means of plate 19, hinge 20 and an adjustable screw 21 to the cam shaft 17 journaled in bearings 18 located at one end of arm 10 thereby permitting the sound detector to be adjusted so that its diaphragm is perpendicular to the sound waves emited by a given source 22, which for example may be a cone loud speaker preferably located at one end of the room. A counter-weight 23 is attached to the other end of arm 10 and is adjusted to counter balance the weight of the sound detector 16 and its associated mechanism when the arm 10 is being rotated by power supplied by motor 24.

The eccentric cams 28 and 29 which are 90° out of phase with respect to each other are also fixedly attached to shaft 12 and are coupled, by means of rods 30 and 31, to the cam shaft 17, the cams of which are also 90° out of phase with respect to each other.

As arm 10 carrying the sound detector 16 at one end makes one complete revolution having shaft 12 as its axis of rotation the sound detector 16, under the influence of cams 28, 29, coupling rods 30, 31, cam shaft 17 and plate 19 also makes one complete revolution having cam shaft 17 as its axis of rotation. By this construction it is possible to rotate the sound detector continuously about a room in a plane that is inclined to both the horizontal and vertical and at the same time keep the device always facing the given sound source. As the detector is moved about the room it is continuously passing through areas of different sound intensities, caused by the sound waves being reflected from the walls of the room. The voltage generated in the detector 16, due to these different sound intensities is fed to an amplifier 34, the output of which is connected to a measuring device 33 and a mean reading on the scale of this measuring device 33 gives a measurement of the sound emanating from the given source which is substantially free from distortion due to the sound waves being reflected from the walls of the room in which measurements are being made.

By reference to the drawing it is obvious that satisfactory results could be obtained by reversing the relative positions of the sound detector 16 and the sound source 22, that is, the sound source 22 could be rotated about the room and the position of the sound detector 16 maintained constant.

It is also obvious that a system of this sort could be employed to determine the characteristics of various sound detectors in which case a standard source of sound 22 would be held stationary and the detector, the characteristics of which are to be determined, would be mounted on arm 10 and rotated about the room.

While in the preferred embodiment of this invention it is desirable to rotate the sound detector at an angle of approximately 45° to the horizontal yet in practice favorable results have been obtained by rotating the detector in either a horizontal or a vertical plane.

What is claimed is:

1. In a sound measuring system, a source of sound, a device responsive to said sound, means for varying the distance between said source and said device in a predetermined manner and means associated with said device for indicating the average intensity of the sound impressed on said device during the variation of the distance between said source and device.

2. In a sound measuring system, a source of sound, a device responsive to variations in sound intensity, means for moving said device with respect to the source of sound, and means for indicating the average value of the sound intensity impressed on said device during its movement.

3. In a sound measuring system, a source of sound, a device responsive to variations in sound intensity, means for continuously moving said device with respect to the source of sound, and means for indicating the average value of the sound intensity impressed on said device during its movement.

4. In a sound measuring system, a source of sound, a device responsive to the variations in sound intensity, means for moving said device with respect to the source of sound, means for maintaining said device orientated to face said source while being moved, and means for indicating the value of the sound intensity impressed on said device.

5. In a sound measuring system, a source of sound, a device responsive to variations in the sound intensity, means for adjusting said device in a vertical plane, means for moving said device with respect to the source of sound, means for maintaining said device orientated to face said source while being moved, and means for indicating the value of the sound intensity impressed on said device.

6. In a device for measuring the characteristics of sound emanating from a sound source, a sound detector, a rotatable arm, means for mounting the detector on said arm so that it faces said source while being rotated, and means for indicating the value of the sound intensity impressed on said device.

7. The method of measuring characteristics of sound emanating from a sound source in a room, which comprises rotating a sound detector about the room, and simultaneously detecting with said detector the sound intensity emanating from said source.

8. In a device for measuring characteristics of sound emanating from a sound source, a sound detector, means comprising a rotatable arm for continuously moving said detector with respect to said source in a plane that is inclined to both the horizontal and vertical, means for maintaining said device orientated to face said source while being moved, and means for indicating the value of the sound intensity impressed on said device.

9. The method of measuring characteristics of sound emanating from a sound source, which comprises continuously rotating a sound detector, maintaining said detector orientated to face the sound source, and detecting the instantaneous values of the sound intensity impressed on the detector.

10. The method of measuring characteristics of sound emanating from a sound source in a room, which comprises rotating a sound detector in a plane that is inclined at an angle to both the horizontal and vertical planes maintaining said detector orientated to face the sound source and detecting the instantaneous values of intensity impressed on the detector for different positions of the detector with respect to the source of sound.

11. In a sound measuring system, a sound producing device, a device for detecting variations in said sound, and means for continuously moving one of said devices in a predetermined manner with respect to the other.

12. A system for measuring sound comprising a sound producing device, a sound translating device and means for moving one of said devices in a fixed path whereby the relative distance between said devices is varied in a predetermined manner.

13. The method of avoiding crests or troughs of standing waves when making sound measurements, which comprises causing relative movement between a given source of sound and a sound responsive device.

14. The method of avoiding crests or troughs of standing waves when making sound measurements which comprises causing relative movement in a predetermined manner in a plurality of planes between a sound detector and a source of sound.

15. In a sound measuring system, a source of sound, a device responsive to variations in sound intensity, means for varying the distance between said source and said device and means comprising an electrical network associated with said device for indicating the average value of the intensity of the sound impressed on said device.

16. The method of measuring characteristics of sound emanating from a sound source in a room, which comprises measuring the average intensity of sound from said source while continuously varying the distance between said source and the point at which the sound waves are detected.

HENRY C. HARRISON.